United States Patent
Hu et al.

(10) Patent No.: US 10,486,379 B2
(45) Date of Patent: Nov. 26, 2019

(54) REDUCING CNT RESISTIVITY BY ALIGNING CNT PARTICLES IN FILMS

(71) Applicant: Goodrich Corporation, Charlotte, NC (US)

(72) Inventors: Jin Hu, Hudson, OH (US); Galdemir Cezar Botura, Akron, OH (US); Casey Slane, Richwood, OH (US); Nathaniel Ching, Uniontown, OH (US)

(73) Assignee: Goodrich Corporation, Charlotte, NC (US)

( * ) Notice: Subject to any disclaimer, the term of this patent is extended or adjusted under 35 U.S.C. 154(b) by 392 days.

(21) Appl. No.: 15/373,371

(22) Filed: Dec. 8, 2016

(65) Prior Publication Data

US 2018/0162077 A1    Jun. 14, 2018

(51) Int. Cl.
| | |
|---|---|
| *B29C 71/00* | (2006.01) |
| *B29D 7/01* | (2006.01) |
| *B29C 71/02* | (2006.01) |
| *H05B 3/14* | (2006.01) |
| *H05B 3/36* | (2006.01) |
| *B29K 105/18* | (2006.01) |
| *B29C 35/02* | (2006.01) |
| *B29K 105/16* | (2006.01) |
| *B64D 15/12* | (2006.01) |

(52) U.S. Cl.
CPC .......... *B29C 71/0072* (2013.01); *B29C 71/02* (2013.01); *B29D 7/01* (2013.01); *C08J 7/08* (2013.01); *H05B 3/145* (2013.01); *H05B 3/36* (2013.01); *B29C 35/0272* (2013.01); *B29C 2035/0211* (2013.01); *B29K 2105/167* (2013.01); *B29K 2105/18* (2013.01); *B64D 15/12* (2013.01); *C08J 2300/22* (2013.01); *H05B 2214/04* (2013.01)

(58) Field of Classification Search
None
See application file for complete search history.

(56) References Cited

U.S. PATENT DOCUMENTS

| | | | |
|---|---|---|---|
| 4,089,034 A * | 5/1978 | Taylor | .............. H01L 41/193 |
| | | | 29/25.42 |
| 8,525,084 B2 | 9/2013 | O'Conner | |
| 9,332,593 B2 | 5/2016 | Keite-Telgenbuscher et al. | |
| 9,337,474 B1 * | 5/2016 | Fischel | .............. H01G 11/24 |

(Continued)

FOREIGN PATENT DOCUMENTS

| | | |
|---|---|---|
| DE | 102007051613 A1 | 4/2009 |
| JP | 2010027251 A * | 2/2010 |
| WO | WO2016126827 A1 | 8/2016 |

OTHER PUBLICATIONS

Extended European Search Report for EP Serial No. 17205956.0, dated May 4, 2018, 8 Pages.

*Primary Examiner* — Jeffrey M Wollschlager
*Assistant Examiner* — Armand Melendez
(74) *Attorney, Agent, or Firm* — Kinney & Lange, P.A.

(57) ABSTRACT

A method for reducing the resistivity of a thermoplastic film containing carbon nanotubes includes connecting an electric power supply to the thermoplastic film containing carbon nanotubes and passing electric current through the thermoplastic film containing carbon nanotubes to heat the thermoplastic film to an elevated temperature and align carbon nanotubes within the thermoplastic film. The thermoplastic film is solid at room temperature.

18 Claims, 1 Drawing Sheet

(56) References Cited

U.S. PATENT DOCUMENTS

| | | |
|---|---|---|
| 2011/0167781 A1 | 7/2011 | Maheshwari |
| 2011/0180524 A1 | 7/2011 | Brittingham et al. |
| 2013/0171406 A1 | 7/2013 | Suehiro et al. |
| 2013/0284718 A1 | 10/2013 | Feng et al. |
| 2014/0106150 A1* | 4/2014 | Decker .................. C03C 17/34 428/216 |
| 2018/0014357 A1* | 1/2018 | Christy .................. H05B 3/145 |

* cited by examiner

REDUCING CNT RESISTIVITY BY ALIGNING CNT PARTICLES IN FILMS

BACKGROUND

Carbon nanotubes (CNTs) are carbon allotropes having a generally cylindrical nanostructure. They have unusual properties that make them valuable for many different technologies. For instance, some CNTs can have high thermal and electrical conductivity, making them suitable for replacing metal heating elements. Due to their much lighter mass, substituting CNTs for metal heating components can reduce the overall weight of a heating component significantly. This makes the use of CNTs of particular interest for applications where weight is critical, such as in aerospace and aviation technologies.

Carbon nanotubes are commercially available in several different forms. One such form is a thermoplastic film filled with CNTs. In a CNT-filled thermoplastic film, individual CNTs are distributed throughout the film. However, the electrical resistivity of these commercially available, CNT-filled thermoplastic films is generally in the range of $3 \times 10^{-4}$ ohms-cm ($\Omega$-cm) or higher. This level of electrical resistivity is not suitable for many aerospace heating applications (e.g., anti-icing and de-icing). Thus, commercially available CNT-filled thermoplastic films cannot currently be used as a substitute for metal heating elements.

SUMMARY

A method for reducing the resistivity of a thermoplastic film containing carbon nanotubes includes connecting an electric power supply to the thermoplastic film containing carbon nanotubes and passing electric current through the thermoplastic film containing carbon nanotubes to heat the thermoplastic film to an elevated temperature and align carbon nanotubes within the thermoplastic film. The thermoplastic film is solid at room temperature.

A method includes providing a thermoplastic film containing carbon nanotubes, connecting the thermoplastic film containing carbon nanotubes to an electric power supply, passing electric current through the thermoplastic film containing carbon nanotubes to heat the thermoplastic film to a first temperature and align carbon nanotubes within the thermoplastic film, attaching the thermoplastic film containing carbon nanotubes to a component, and passing electric current through the thermoplastic film containing carbon nanotubes to heat the thermoplastic film to a second temperature to provide anti-icing or de-icing to the component. The thermoplastic film is solid at room temperature, and the second temperature is lower than the first temperature.

DETAILED DESCRIPTION

This disclosure provides methods for reducing the resistivity of a carbon nanotube-filled thermoplastic film. Thermoplastic films containing carbon nanotubes (CNTs) ordinarily do not possess the desired electrical conductivity needed for use in electrothermal heaters. To reduce the resistivity (and increase conductivity) of a CNT-filled thermoplastic film, Joule heating is applied to the film (by passing electric current through the film) until the film reaches a temperature close to the thermoplastic's melting temperature. At the elevated temperature, the CNTs within the film align in the direction of current flow to a certain degree, thereby increasing the conductivity of the film. The disclosed methods allow for the improvement of CNT-filled thermoplastic films without the addition of mass or the addition of functional groups to the CNTs using chemical processes.

Figure 1:
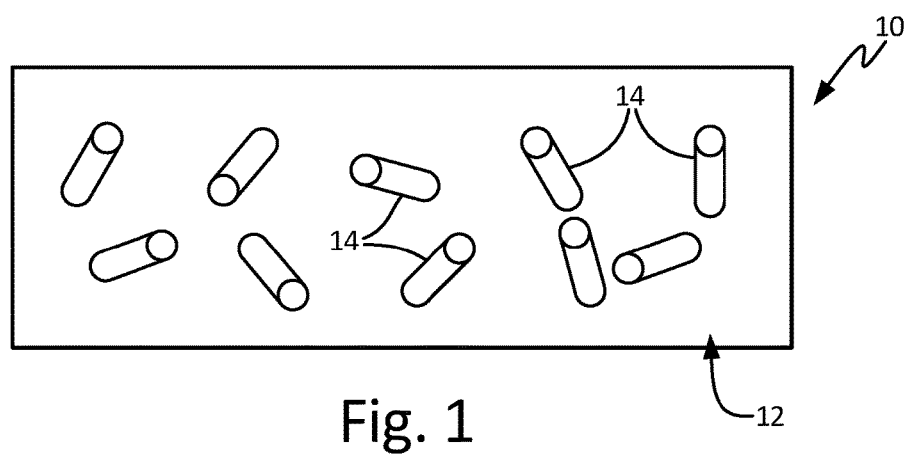
FIG. 1 is a schematic view of a CNT-filled thermoplastic film.

FIG. 1 schematically illustrates one example of a CNT-filled thermoplastic film. Carbon nanotube-filled thermoplastic film 10 includes thermoplastic body or matrix 12 and a plurality of CNTs 14 dispersed throughout thermoplastic matrix 12. Thermoplastic matrix 12 is a solid at room temperature (~25° C.). Examples of suitable materials for thermoplastic matrix 12 include polyethylene, polypropylene, polyimides such as polyetherimide (PEI), acrylonitrile butadiene styrene (ABS), nylon, polyesters such as polyethylene terephthalate (PET) and polyethylene napthalate (PEN), polylactic acid (polylactide) (PLA), polyurethanes, polyether ether ketones (PEEK), polybenzimidazole, polyether sulfone (PES) and combinations thereof.

Figure 2:
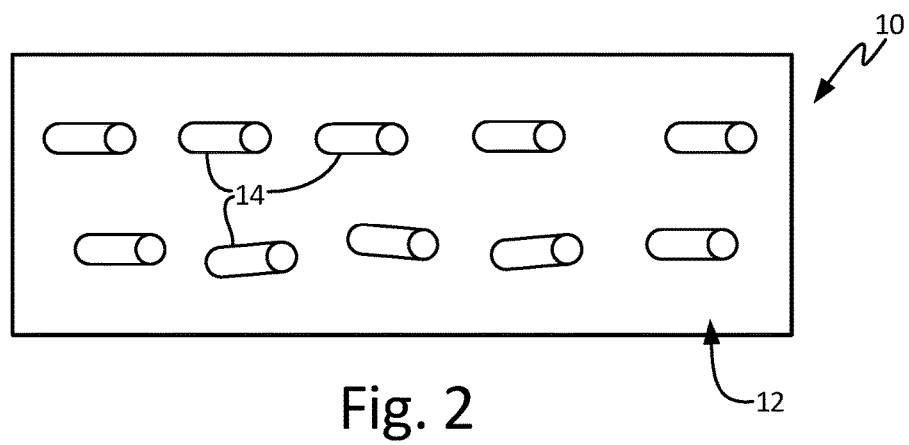
FIG. 2 is a schematic view of a CNT-filled thermoplastic film containing aligned CNTs.

As shown in FIG. 1, CNTs 14 are dispersed throughout thermoplastic matrix 12. Carbon nanotubes 14 generally have cylindrical nanostructures and are semiconducting along their tubular axis. Carbon nanotube-filled thermoplastic film 10 contains a high enough loading of CNTs 14 that it functions as a conductor. When CNTs 14 are randomly oriented (as shown in FIG. 1), CNT-filled thermoplastic film 10 can have a relatively high resistance (about $3 \times 10^{-4}$ ohms-cm). Because CNTs 14 in thermoplastic matrix 12 are not arranged "end-to-end", CNTs 14 do not conduct at their optimal level and the resistivity of CNT-filled thermoplastic film 10 is increased. However, when CNTs 14 are aligned such that they are generally arranged tube end-to-tube end, CNTs 14 conduct better and the overall resistivity of CNT-filled thermoplastic film 10 is reduced. FIG. 2 schematically illustrates aligned CNTs 14 in carbon nanotube-filled thermoplastic film 10. While perfect alignment is unlikely to occur, FIGS. 1 and 2 are intended to schematically show the difference between a disordered system (FIG. 1) and an ordered or aligned system (FIG. 2). This disclosure provides methodology for aligning CNTs to reduce the resistivity of a CNT-filled thermoplastic film. By reducing the resistivity of CNT-filled thermoplastic film 10, film 10 becomes a suitable replacement for the alloy heating elements currently used for aircraft ice protection.

When electric current passes through carbon nanotubes in a solution, the carbon nanotubes typically align themselves tube end-to-tube end and provide optimal conductivity. In thermoplastic matrix 12, however, CNTs 14 are not able to change their orientation at room temperature because thermoplastic matrix 12 is a solid and not a liquid. To remedy this, an electric current is passed through CNT-filled thermoplastic film 10 to provide joule heating to thermoplastic matrix 12 and soften thermoplastic matrix 12. Once thermoplastic matrix 12 has softened, CNTs 14 are able to reorient themselves in the direction of electric current flow.

To align CNTs 14 in CNT-filled thermoplastic film 10 and reduce the resistivity of CNT-filled thermoplastic film 10, an electric power supply is connected to CNT-filled thermoplastic film 10. Once CNT-filled thermoplastic film 10 is connected to the power supply, electric current is delivered through CNT-filled thermoplastic film 10. The passage of electric current causes CNT-filled thermoplastic film 10, including thermoplastic matrix 12, to increase in temperature due to the presence of CNTs 14 which provide resistive heating (Joule heating). As electric current passes through CNTs 14, CNTs 14 release heat into thermoplastic matrix 12. As the temperature of thermoplastic matrix 12 approaches its melting temperature, thermoplastic matrix 12 softens. Thermoplastic matrix 12 softens enough so that CNTs 14 can move within thermoplastic matrix 12 and CNTs 14 preferentially align themselves tube end-to-tube end in the direction of electric current flow.

The melting temperature of thermoplastic matrix 12 can vary depending on its composition. For example, the glass transition temperature of PEEK is about 143° C. (289° F.) and its melting temperature is about 343° C. (649° F.). Electric current is passed through CNT-filled thermoplastic film 10 (and Joule heating occurs) until thermoplastic matrix 12 approaches its melting temperature. The passage of electric current to CNT-filled thermoplastic film 10 is halted before thermoplastic matrix 12 reaches its melting temperature to prevent CNT-filled thermoplastic film 10 from liquefying and losing its general shape. Electric current can be delivered to CNT-filled thermoplastic film 10 in pulses to keep thermoplastic film 12 below its melting point but still "softened". The pulses of electric current will continue to allow CNTs 14 to align within thermoplastic matrix 12.

In some embodiments, CNT-filled thermoplastic film 10 is heated to a temperature that does not exceed 10° C. below the melting temperature of thermoplastic film 12 (i.e. melting temperature minus 10° C.). In other embodiments, CNT-filled thermoplastic film 10 is heated to a temperature that does not exceed 20° C. below the melting temperature of thermoplastic film 12 (i.e. melting temperature minus 20° C.). In still other embodiments, CNT-filled thermoplastic film 10 is heated to a temperature above the glass transition temperature ($T_g$) of thermoplastic film 12 but below its melting temperature. In some cases, electric current can be passed through CNT-filled thermoplastic film 10 while film 10 is in an appropriately sized and shaped container so that CNT-filled thermoplastic film 10 does not lose its desired shape as it softens.

As thermoplastic film 12 softens and becomes pliable, CNTs 14 begin to align themselves tube end-to-tube end with respect to one another due to the passage of electric current through CNT-filled thermoplastic film 10. Given enough time, substantially all CNTs 14 will be aligned tube end-to-tube end where possible. The length of time electric current is passed through CNT-filled thermoplastic film 10 depends on the melting temperature of thermoplastic matrix 12, the maximum temperature to which CNT-filled thermoplastic film 10 will be heated, and the desired degree of CNT 14 "alignment". Generally speaking, the closer the temperature of CNT-filled thermoplastic film 10 is to the melting temperature of thermoplastic matrix 12, the less time is needed to allow CNTs 14 to align tube end-to-tube end. For example, a given CNT-filled film heated to and maintained (by current pulsing) at a temperature of about 140° C. for 30 minutes may provide the same amount of CNT alignment as the same film heated to and maintained at a temperature of about 120° C. for 60 minutes. In some embodiments, electric current is passed through CNT-filled thermoplastic film 10 for no longer than 60 minutes.

By aligning CNTs 14 tube end-to-tube end within thermoplastic matrix 12, the resistivity of CNT-filled thermoplastic film 10 can be reduced compared to its commercially available or off-the-shelf state. The resistivity of CNT-filled thermoplastic film 10 after the passage of electric current through CNT-filled thermoplastic film 10 is expected to be less than $1 \times 10^{-4}$ ohms-cm ($\Omega$-cm). In some embodiments, electric current is passed through CNT-filled thermoplastic film 10 (and subjected to Joule heating) until its resistivity is less than 3 ohms per square ($\Omega$/sq). In one particular embodiment a treated CNT-filled thermoplastic film has a resistivity of about $8 \times 10^{-5}$ $\Omega$-cm, which is close to the resistivity of stainless steel.

In some embodiments, CNTs 14 are aligned within CNT-filled thermoplastic film 10 at a temperature greater than the temperature at which they are used to provide ice protection. In these cases, electric current is passed through CNT-filled thermoplastic film 10 and film 10 is heated to a first temperature to align CNTs 14 as described herein. Once CNTs 14 have been suitably aligned, CNT-filled thermoplastic film 10 can be attached to a component for which it will provide ice protection (e.g., anti-icing, de-icing). During operation, electric current is passed through CNT-filled thermoplastic film 10 to provide Joule heating to the component. Film 10 is heated to a second temperature (lower than the first temperature) during operation.

While the instant disclosure refers particularly to carbon nanotubes, it is theorized that the resistivity of thermoplastic films containing other electrically conductive carbon allotrope particles (e.g., graphene nanoribbons) would behave in a similar fashion. Embodiments containing other suitable carbon allotropes are within the scope of the instant disclosure.

The methods disclosed herein provide means for reducing the resistivity of CNT-filled thermoplastic films without increasing their mass or requiring the chemical processes needed to add resistivity-reducing functional groups to the carbon backbone of the CNT materials. The disclosure allows commercially available CNT-filled thermoplastic film to be useful for aerospace and aircraft anti-icing and de-icing applications.

Discussion of Possible Embodiments

The following are non-exclusive descriptions of possible embodiments of the present invention.

A method for reducing the resistivity of a thermoplastic film containing carbon nanotubes can include connecting an electric power supply to the thermoplastic film containing carbon nanotubes where the thermoplastic film is solid at room temperature and passing electric current through the thermoplastic film containing carbon nanotubes to heat the thermoplastic film to an elevated temperature and align carbon nanotubes within the thermoplastic film.

The method of the preceding paragraph can optionally include, additionally and/or alternatively, any one or more of the following features, configurations and/or additional components:

The elevated temperature can be less than a melting temperature of the thermoplastic film by at least 10° C.

The elevated temperature can be less than a melting temperature of the thermoplastic film by at least 20° C.

The thermoplastic film can include a compound selected from the group of polyethylene, polypropylene, polyimides such as polyetherimide (PEI), acrylonitrile butadiene styrene (ABS), nylon, polyesters such as polyethylene terephthalate (PET) and polyethylene napthalate (PEN), polylactic acid (polylactide) (PLA), polyurethanes, polyether ether ketones (PEEK), polybenzimidazole, polyether sulfone (PES) and combinations thereof.

The electric current can be passed through the thermoplastic film containing carbon nanotubes to align the carbon nanotubes for no more than 60 minutes.

The resistivity of the thermoplastic film containing carbon nanotubes after passing electric current through the thermoplastic film can be less than 3 ohms per square (Ω/sq).

The resistivity of the thermoplastic film containing carbon nanotubes after passing electric current through the thermoplastic film can be less than $1\times10^{-4}$ ohms-cm (Ω-cm).

The resistivity of the thermoplastic film containing carbon nanotubes after passing electric current through the thermoplastic film can be about $8\times10^{-5}$ Ω-cm.

Pulsed electric current can be passed through the thermoplastic film containing carbon nanotubes to prevent the thermoplastic film from reaching its melting temperature.

A method can include providing a thermoplastic film containing carbon nanotubes where the thermoplastic film is solid at room temperature, connecting the thermoplastic film containing carbon nanotubes to an electric power supply, passing electric current through the thermoplastic film containing carbon nanotubes to heat the thermoplastic film to a first temperature and align carbon nanotubes within the thermoplastic film, attaching the thermoplastic film containing carbon nanotubes to a component, and passing electric current through the thermoplastic film containing carbon nanotubes to heat the thermoplastic film to a second temperature to provide anti-icing or de-icing to the component where the second temperature is lower than the first temperature.

The method of the preceding paragraph can optionally include, additionally and/or alternatively, any one or more of the following features, configurations and/or additional components:

The first temperature can be less than a melting temperature of the thermoplastic film by at least 10° C.

The first temperature can be less than a melting temperature of the thermoplastic film by at least 20° C.

The thermoplastic film can include a compound selected from the group of polyethylene, polypropylene, polyimides such as polyetherimide (PEI), acrylonitrile butadiene styrene (ABS), nylon, polyesters such as polyethylene terephthalate (PET) and polyethylene napthalate (PEN), polylactic acid (polylactide) (PLA), polyurethanes, polyether ether ketones (PEEK), polybenzimidazole, polyether sulfone (PES) and combinations thereof.

The electric current can be passed through the thermoplastic film containing carbon nanotubes to align the carbon nanotubes for no more than 60 minutes.

The resistivity of the thermoplastic film containing carbon nanotubes after passing electric current through the thermoplastic film can be less than 3 Ω/sq.

The resistivity of the thermoplastic film containing carbon nanotubes after passing electric current through the thermoplastic film can be less than $1\times10^{-4}$ Ω-cm.

The resistivity of the thermoplastic film containing carbon nanotubes after passing electric current through the thermoplastic film can be about $8\times10^{-5}$ Ω-cm.

Pulsed electric current can be passed through the thermoplastic film containing carbon nanotubes to prevent the thermoplastic film from reaching its melting temperature.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for reducing the resistivity of a thermoplastic film containing carbon nanotubes, the method comprising:
    connecting an electric power supply to the thermoplastic film containing carbon nanotubes, wherein the thermoplastic film is solid at room temperature; and
    passing electric current through the thermoplastic film containing carbon nanotubes to heat the thermoplastic film to an elevated temperature lower than a melting temperature of the thermoplastic film and align carbon nanotubes within the thermoplastic film without the thermoplastic film liquifying.

2. The method of claim 1, wherein the elevated temperature is less than the melting temperature of the thermoplastic film by at least 10° C.

3. The method of claim 2, wherein the elevated temperature is less than the melting temperature of the thermoplastic film by at least 20° C.

4. The method of claim 1, wherein the thermoplastic film comprises a compound selected from the group of polyethylene, polypropylene, polyimides including polyetherimide (PEI), acrylonitrile butadiene styrene (ABS), nylon, polyesters including polyethylene terephthalate (PET) and polyethylene napthalate (PEN), polylactic acid (polylactide) (PLA), polyurethanes, polyether ether ketones (PEEK), polybenzimidazole, polyether sulfone (PES) and combinations thereof.

5. The method of claim 1, wherein electric current passes through the thermoplastic film containing carbon nanotubes to align the carbon nanotubes for no more than 60 minutes.

6. The method of claim 1, wherein the resistivity of the thermoplastic film containing carbon nanotubes after passing electric current through the thermoplastic film is less than 3 ohms per square (Ω/sq).

7. The method of claim 1, wherein the resistivity of the thermoplastic film containing carbon nanotubes after passing electric current through the thermoplastic film is less than $1\times10^{-4}$ ohms-cm (Ω-cm).

8. The method of claim 1, wherein the resistivity of the thermoplastic film containing carbon nanotubes after passing electric current through the thermoplastic film is about $8\times10^{-5}$ Ω-cm.

9. The method of claim 1, wherein pulsed electric current passes through the thermoplastic film containing carbon nanotubes to prevent the thermoplastic film from reaching its melting temperature.

10. A method comprising:
    providing a thermoplastic film containing carbon nanotubes, wherein the thermoplastic film is solid at room temperature;
    connecting the thermoplastic film containing carbon nanotubes to an electric power supply;
    passing electric current through the thermoplastic film containing carbon nanotubes to heat the thermoplastic film to a first temperature lower than a melting temperature of the thermoplastic film and align carbon nanotubes within the thermoplastic film without the thermoplastic film liquifying;
    attaching the thermoplastic film containing carbon nanotubes to a component; and
    passing electric current through the thermoplastic film containing carbon nanotubes to heat the thermoplastic film to a second temperature to provide anti-icing or de-icing to the component, wherein the second temperature is lower than the first temperature.

11. The method of claim 10, wherein the first temperature is less than the melting temperature of the thermoplastic film by at least 10° C.

12. The method of claim 11, wherein the first temperature is less than the melting temperature of the thermoplastic film by at least 20° C.

13. The method of claim 10, wherein the thermoplastic film comprises a compound selected from the group of polyethylene, polypropylene, polyimides such as polyetherimide (PEI), acrylonitrile butadiene styrene (ABS), nylon, polyesters such as polyethylene terephthalate (PET) and polyethylene napthalate (PEN), polylactic acid (polylactide) (PLA), polyurethanes, polyether ether ketones (PEEK), polybenzimidazole, polyether sulfone (PES) and combinations thereof.

14. The method of claim 10, wherein electric current passes through the thermoplastic film containing carbon nanotubes to align the carbon nanotubes for no more than 60 minutes.

15. The method of claim 10, wherein the resistivity of the thermoplastic film containing carbon nanotubes after passing electric current through the thermoplastic film is less than 3 Ω/sq.

16. The method of claim 10, wherein the resistivity of the thermoplastic film containing carbon nanotubes after passing electric current through the thermoplastic film is less than $1\times10^{-4}$ Ω-cm.

17. The method of claim 10, wherein the resistivity of the thermoplastic film containing carbon nanotubes after passing electric current through the thermoplastic film is about $8\times10^{-5}$ Ω-cm.

18. The method of claim 10, wherein pulsed electric current passes through the thermoplastic film containing carbon nanotubes to prevent the thermoplastic film from reaching its melting temperature.

* * * * *